US012229859B2

(12) United States Patent
Meiners et al.

(10) Patent No.: US 12,229,859 B2
(45) Date of Patent: Feb. 18, 2025

(54) SURFACE ANIMATION DURING DYNAMIC FLOOR PLAN GENERATION

(71) Applicant: PassiveLogic, Inc., Salt Lake City, UT (US)

(72) Inventors: Justin Meiners, Murray, UT (US); Troy Aaron Harvey, Brighton, UT (US)

(73) Assignee: PassiveLogic, Inc., Holladay, UT (US)

( * ) Notice: Subject to any disclaimer, the term of this patent is extended or adjusted under 35 U.S.C. 154(b) by 170 days.

(21) Appl. No.: 18/071,019

(22) Filed: Nov. 29, 2022

(65) Prior Publication Data

US 2024/0177385 A1 May 30, 2024

(51) Int. Cl.
| | |
|---|---|
| *G06T 13/20* | (2011.01) |
| *G01S 17/89* | (2020.01) |
| *G06F 3/0488* | (2022.01) |
| *G06T 11/20* | (2006.01) |
| *G06T 11/40* | (2006.01) |
| *G06T 17/20* | (2006.01) |
| *G06T 19/00* | (2011.01) |

(52) U.S. Cl.
CPC .............. *G06T 13/20* (2013.01); *G01S 17/89* (2013.01); *G06T 11/203* (2013.01); *G06T 11/40* (2013.01); *G06T 17/20* (2013.01); *G06T 19/006* (2013.01); *G06F 3/0488* (2013.01); *G06T 2200/24* (2013.01); *G06T 2210/21* (2013.01); *G06T 2210/62* (2013.01)

(58) Field of Classification Search
CPC ....... G06T 13/20; G06T 11/203; G06T 11/40; G06T 19/006; G06T 2200/24
See application file for complete search history.

(56) References Cited

U.S. PATENT DOCUMENTS

| | | | |
|---|---|---|---|
| 2013/0301953 A1* | 11/2013 | Montague | G06F 3/04845 345/660 |
| 2017/0287222 A1* | 10/2017 | Fujimaki | G06F 3/017 |
| 2019/0221040 A1* | 7/2019 | Shantharam | G06T 19/006 |
| 2020/0117898 A1* | 4/2020 | Tian | G06F 3/04815 |
| 2021/0279957 A1* | 9/2021 | Eder | G06T 7/80 |
| 2024/0153096 A1* | 5/2024 | Meiners | G06T 15/06 |

FOREIGN PATENT DOCUMENTS

JP 2020017267 A * 1/2020

OTHER PUBLICATIONS

English translation of JP2020017267A (Year: 2020).*

* cited by examiner

*Primary Examiner* — Grace Q Li

(57) ABSTRACT

Apparatuses, methods, systems, and program products are disclosed for surface animation during dynamic floor plan generation. An apparatus includes a display configured to receive touch input, a processor coupled to the display, and a memory that stores code executable by the processor. The code is executable by the processor to receive a user input associated with a surface of a structure presented on the display, generate, in response to the user input, a two-dimensional representation of the floor plan comprising a line segment representing the surface of the structure, determine at least one three-dimensional element associated with the line segment representing the surface on the two-dimensional representation of floor plan, and gradually highlight the surface shown on the display where the geometric plane that the line segment defines intersects with the at least one three-dimensional element associated with the line segment.

20 Claims, 10 Drawing Sheets

SURFACE ANIMATION DURING DYNAMIC FLOOR PLAN GENERATION

FIELD

This invention relates to surface scans and more particularly relates to dynamically highlighting a surface during floor plan generation.

BACKGROUND

Conventional methods to create floor plans include using techniques that are slightly more automated than using a measuring tape and graph paper. Scanning systems have been created using depth detection and ranging that create a point cloud of assorted surfaces within a building. However, turning the point clouds into understandable floor plans is a very complex problem.

SUMMARY

Apparatuses, methods, systems, and program products are disclosed for surface animation during dynamic floor plan generation. In one embodiment, an apparatus includes a display configured to receive touch input, a processor coupled to the display, and a memory that stores code executable by the processor. In one embodiment, the code is executable by the processor to receive a user input associated with a surface of a structure presented on the display. In one embodiment, the surface defines a portion of a floor plan. In one embodiment, the code is executable by the processor to generate, in response to the user input, a two-dimensional representation of the floor plan comprising a line segment representing the surface of the structure. In one embodiment, the line segment defining a geometric plane in a third dimension. In one embodiment, the code is executable by the processor to determine at least one three-dimensional element associated with the line segment representing the surface on the two-dimensional representation of floor plan. In one embodiment, the code is executable by the processor to gradually highlight the surface shown on the display where the geometric plane that the line segment defines intersects with the at least one three-dimensional element associated with the line segment. In one embodiment, the highlight is presented as a graphical animation that extends from a center point of the user input to an ending point.

In one embodiment, the code is executable by the processor to overlay a graphic representing the two-dimensional representation of floor plan on the display.

In one embodiment, the code is executable by the processor to receive a second user input associated with a second surface of a second structure presented on the display, generate a second two-dimensional representation of floor plan that is a copy of the two-dimensional representation of floor plan and further includes a second line segment representing the second surface, the second line segment defining a second geometric plane in the third dimension, and gradually highlight the surface shown on the display where the geometric plane that the line segment defines intersects with the at least one three-dimensional element associated with the line segment, the highlight presented as a graphical animation that extends from a center point of the user input to an ending point.

In one embodiment, the code is executable by the processor to overlay a graphic representing the two-dimensional representation of floor plan on the display.

In one embodiment, the code is executable by the processor to receive a second user input associated with a second surface of a second structure presented on the display, generate a second two-dimensional representation of floor plan that is a copy of the two-dimensional representation of floor plan and further includes a second line segment representing the second surface, the second line segment defining a second geometric plane in the third dimension, and replace the two-dimensional representation of floor plan with the second two-dimensional representation of floor plan that includes the second line segment, a third line segment, etc, as a single marking may generate more than one line segment. An example of a single marking generating two line segments is shown with reference to FIG. 7C.

In one embodiment, the code is executable by the processor to determine at least one three-dimensional element associated with the second line segment representing the second surface on the second two-dimensional floor plan and gradually highlight the second surface shown on the display where the second geometric plane that the second line segment defines intersects with the at least one three-dimensional element associated with the second line segment, the highlight presented as a graphical animation that extends from a center point of the second user input to a second ending point.

In one embodiment, the code is executable by the processor to, on the display, fade out the overlay of the graphic representing the two-dimensional representation of floor plan and fade in a second overlay of a second graphic representing the second two-dimensional floor plan.

In one embodiment, the code is executable by the processor to complete the highlight of the second surface at substantially the same time as the second overlay of the second graphic representing the second two-dimensional floor plan fades in.

In one embodiment, the second structure is the same as the structure, the second surface comprising a different portion of the structure than the surface.

In one embodiment, the highlight comprises a semi-transparent color that gradually floods the representation of the floor plan on the display from the center point of the user input to the ending point.

In one embodiment, the highlight gradually extends as a radius from the center point of the user input at a predefined rate.

In one embodiment, the ending point comprises at least one of a corner or a point that is a threshold distance from the center point of the user input.

In one embodiment, the user input comprises a touch input received on the display, the touch input graphically represented by a marker on the surface presented on the display.

In one embodiment, the apparatus further comprises a vertex shader that is used to determine edges of the at least one three-dimensional element that should be highlighted based on whether the geometric plane that the line segment defines intersecting with the at least one three-dimensional element.

In one embodiment, the apparatus further comprises a light detection and ranging ("LiDAR") sensor that is used to generate a graphical mesh of the surface of the structure, the graphical mesh presented on the display in an augmented reality ("AR") environment overlaying an image of the structure.

In one embodiment, the code is executable by the processor to highlight one or more vertices of the at least one three-dimensional element that intersects the geometric plane that the line segment defines.

In one embodiment, the at least one three-dimensional element is a three-dimensional chunk of the graphical mesh.

In one embodiment, the structure comprises a wall of a building.

In one embodiment, a method receives a user input associated with a surface of a structure presented on the display. In one embodiment, the surface defines a portion of a floor plan. In one embodiment, a method generates, in response to the user input, a two-dimensional representation of the floor plan comprising a line segment representing the surface of the structure. In one embodiment, the line segment defining a geometric plane in a third dimension. In one embodiment, a method determines at least one three-dimensional element associated with the line segment representing the surface on the two-dimensional representation of floor plan. In one embodiment, a method gradually highlights the surface shown on the display where the geometric plane that the line segment defines intersects with the at least one three-dimensional element associated with the line segment. In one embodiment, the highlight is presented as a graphical animation that extends from a center point of the user input to an ending point.

In one embodiment, the method overlays a graphic representing the two-dimensional representation of floor plan on the display.

In one embodiment, the method receives a second user input associated with a second surface of a second structure presented on the display, generates a second two-dimensional representation of floor plan that is a copy of the two-dimensional representation of floor plan and further includes a second line segment representing the second surface, the second line segment defining a second geometric plane in the third dimension, and replaces the two-dimensional representation of floor plan with the second two-dimensional representation of floor plan that includes the second line segment.

In one embodiment, the method determines at least one three-dimensional element associated with the second line segment representing the second surface on the second two-dimensional representation of floor plan and gradually highlights the second surface shown on the display where the second geometric plane that the second line segment defines intersects with the at least one three-dimensional element associated with the second line segment, the highlight presented as a graphical animation that extends from a center point of the second user input to a second ending point.

In one embodiment, a non-transitory machine-readable medium includes instructions for receiving a user input associated with a surface of a structure presented on the display. In one embodiment, the surface defines a portion of a floor plan. In one embodiment, the non-transitory machine-readable medium includes instructions for generating, in response to the user input, a two-dimensional representation of the floor plan comprising a line segment representing the surface of the structure. In one embodiment, the line segment defining a geometric plane in a third dimension. In one embodiment, the non-transitory machine-readable medium includes instructions for determining at least one three-dimensional element associated with the line segment representing the surface on the two-dimensional representation of floor plan. In one embodiment, the non-transitory machine-readable medium includes instructions for gradually highlighting the surface shown on the display where the geometric plane that the line segment defines intersects with the at least one three-dimensional element associated with the line segment. In one embodiment, the highlight is presented as a graphical animation that extends from a center point of the user input to an ending point.

In one embodiment, an apparatus includes means for receiving a user input associated with a surface of a structure presented on the display. In one embodiment, the surface defines a portion of a floor plan. In one embodiment, the apparatus includes means for generating, in response to the user input, a two-dimensional representation of the floor plan comprising a line segment representing the surface of the structure. In one embodiment, the line segment defining a geometric plane in a third dimension. In one embodiment, the apparatus includes means for determining at least one three-dimensional element associated with the line segment representing the surface on the two-dimensional representation of floor plan. In one embodiment, the apparatus includes means for gradually highlighting the surface shown on the display where the geometric plane that the line segment defines intersects with the at least one three-dimensional element associated with the line segment. In one embodiment, the highlight is presented as a graphical animation that extends from a center point of the user input to an ending point.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
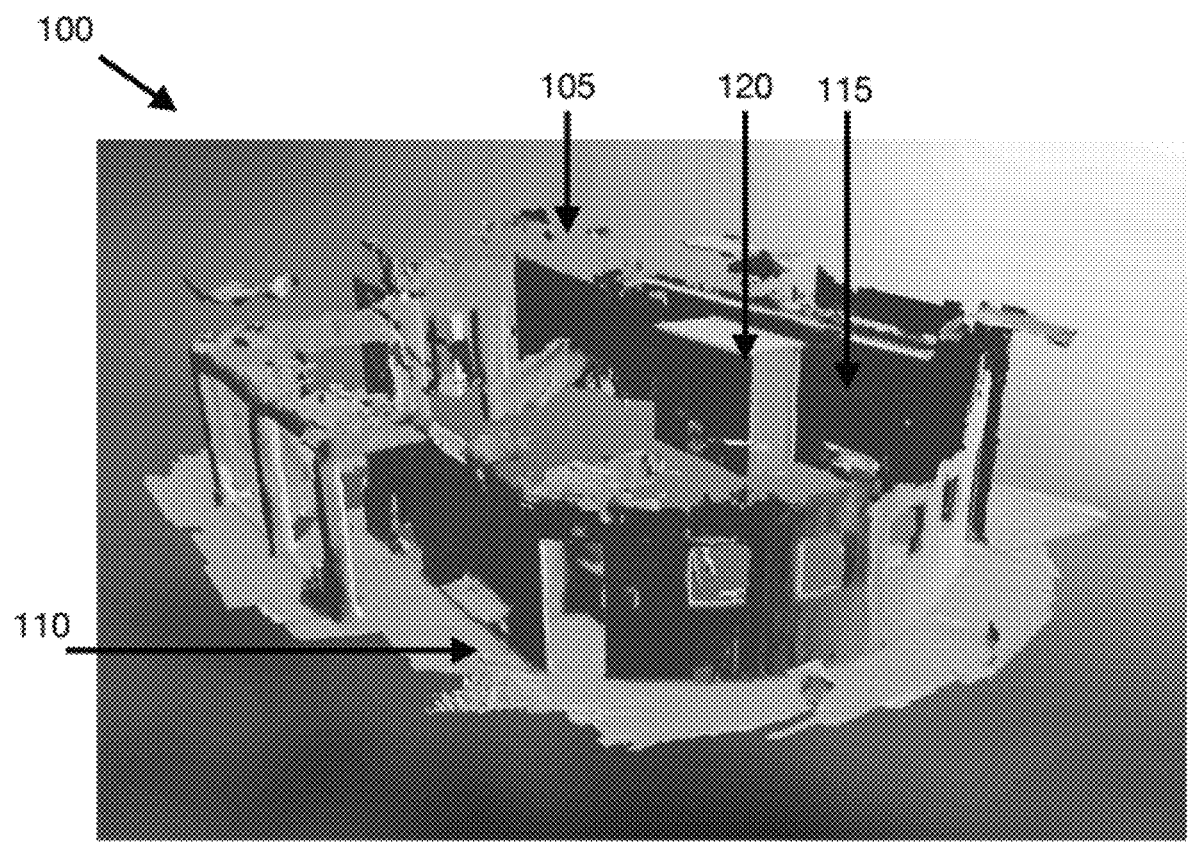
FIG. 1 is a LIDAR scan showing unstructured data artifacts.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

As background, in Augmented Reality ("AR")/Light Detection and Ranging ("LiDAR"), visual feedback should be provided which teaches the used how their action affect a scan. For example, it would be ideal to convey how touching a wall displayed on a screen modifies a floorplan that is being created using AR. As a result, there needs to be a good way to show the progress of the floorplan as a result of the touch. As a possible design restraint, there may not be control over the color or lighting of the objects in the real world. As a technical restraint, any effects should run at real-time (which may be 60 FPS) to keep the experience smooth. As another restraint, since the LiDAR meshes are constantly changing, the mesh cannot be constantly engaging with the COP to reanalyze. As even a further restraint, the device running the LiDAR, such as a phone, may already be running at a heavy utilization for AR, so any solution should not use too many CPUs. We present here disclosures that meet all these goals.

AR allows one to capture a detailed cloud of three-dimensional ("3D") points, with reasonable accuracy and precision, in real-time, e.g., simply by walking through a building and scanning the area with a 2D camera and 3D depth scanner (e.g., LiDAR). This cloud of 3D points may be automatically structured to create a 3D mesh. This 3D mesh may then be transformed into a floor plan. Methods to extract a floor plan and extract a series of segments from a floor plan are described in patent application Ser. No. 17/855,513, filed on Jun. 30, 2022, hereby incorporated by reference herein in full for all purposes, and patent application Ser. No. 17/459,084, filed on Sep. 15, 2021, hereby incorporated by reference herein in full for all purposes. Here, we describe a mechanism for providing interactive visual feedback to the user throughout such a scanning process. Briefly, in some embodiments, a user may use an input screen during scanning a room to determine what portions of the room have been correctly scanned. As shown with reference to FIG. 4A, the user may be presented with a picture on a display screen that shows a portion of the room being scanned. Also, there may be an in-screen window that shows the current floorplan of the room (as shown with reference to FIG. 4A at 412. Walls (or other structures) that have already been discovered may have a highlight color on them already showing which parts of the floorplan have been discovered. A user may add a mark to the display screen that corresponds with a wall that has yet to be processed, that has been processed incorrectly, etc. The mark being added may cause a new floorplan to be generated. This new floorplan may extend a current wall, may mark a new wall that produces two walls with a corner, may fix a mistake in the previous plan, etc.

In an embodiment, a wall has previously been marked that extends for quite some distance. Another mark is placed on a representation of a wall that makes a corner with the original wall, halfway down the wall. The new display should show the wall coloring stop at the new wall, and extend around the corner of the new wall. A new floorplan may be generated from an underlying 3D mesh that colors in the new walls represented by the floorplan. The new floorplan may fade into view on the display screen simultaneously with the old floorplan fading out. In some embodiments, the new floorplan may start as the mark made by the user which then animates outward, filling in the newly discovered wall. This flood-fill animation is described in greater detail with reference to FIG. 6. In some embodiments, the mark made by the user may animate outward, filling in all of the now-discovered walls. Essentially, the flood-fill animation communicates that a single marking can represent an entire surface, communicated by having the coloring animation growing out from the touch.

A significant challenge is for this animation to properly blend with the floor plan information. For example, when the marking is creating a joint at a corner, the flood fill animation should stop at this corner. However, special processing must be done for the fill to animate correctly, as provided herein. When a new marking is added to the end of a wall, the animation extends to that end of that wall, and, in some embodiments, also over to the original end. When a new marker is added between two existing markers, then there is a subtle fill animation on the wall depiction, but no change in the floor plan. When a new marker adds a new intersection and a corner, the new intersection trims the extent of the previously highlighted area. The old extent from the new marker to the end of the wall immediately loses its color. The animation fills the new section of wall and meets the old line at the corner.

Figure 2:
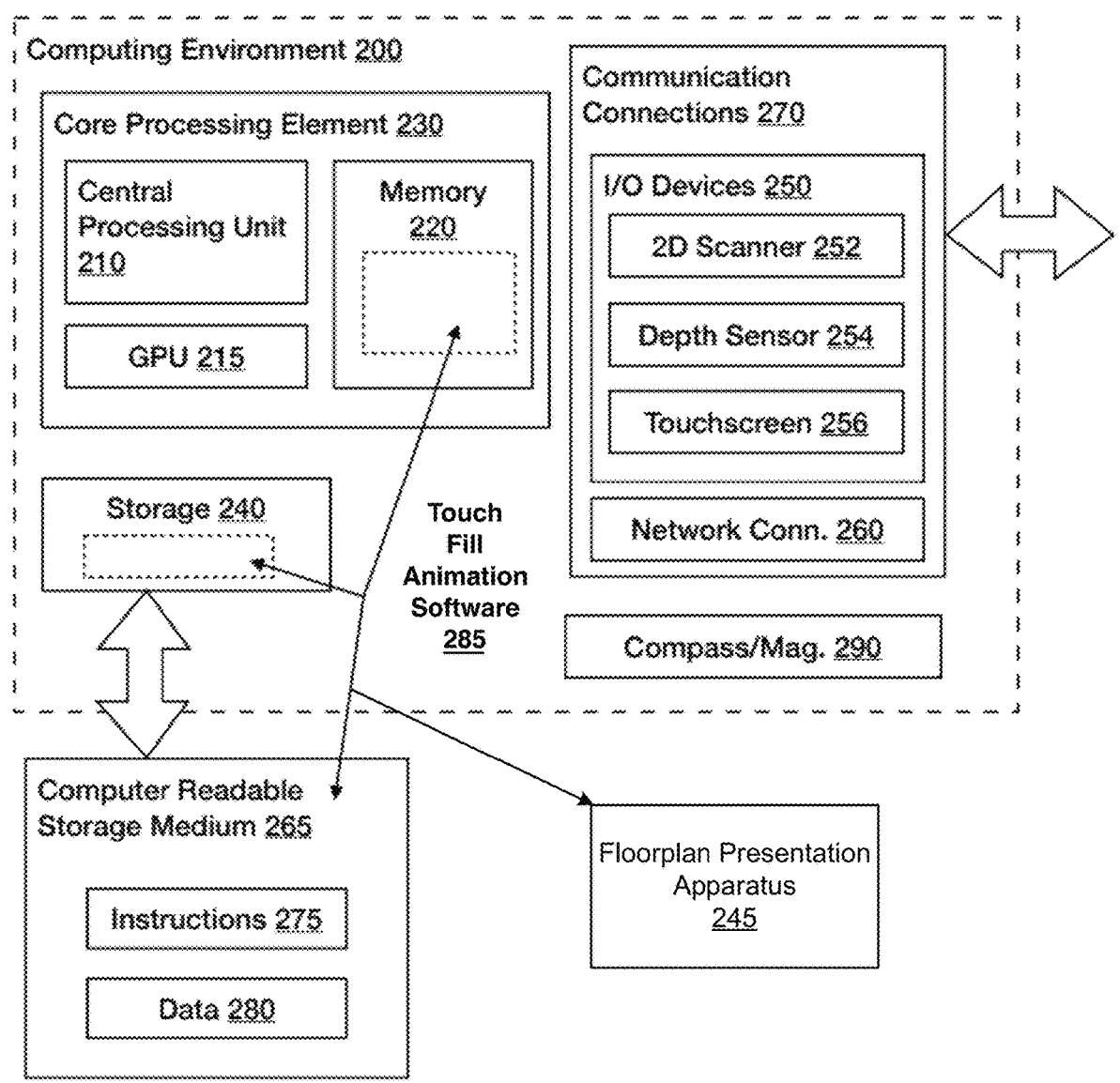
FIG. 2 is a functional block diagram showing an exemplary embodiment of some features of a scanning device.

FIG. 2 illustrates a generalized example of a computing environment 200 in which the embodiments described herein may be implemented. The computing environment 200 is not intended to suggest any limitation as to scope of use or functionality of the disclosure, as the present disclosure may be implemented in diverse general-purpose or special-purpose computing environments.

With reference to FIG. 2, core processing is indicated by the core processing element 230. The computing environment 200 includes at least one central processing unit 210, a GPU 215, and memory 220. The central processing unit 210 executes computer-executable instructions and may be a real or a virtual processor. The memory 220 may be volatile memory (e.g., registers, cache, RAM), non-volatile memory (e.g., ROM, EEPROM, flash memory, etc.), or some combination of the two. The memory 220 stores software 285 implementing the described methods of capturing building features using depth scans.

A computing environment 200 may have additional features. For example, the computing environment 200 may include storage 240 and communication connections 270, which may include one or more input/output devices 250, one or more network connections (e.g., wired, wireless, etc.) 260 as well as other communication connections (not shown). Communication connections 270 may include one or more wireless transceivers for performing wireless communication and/or one or more communication ports for performing wired communication. In embodiments, communication connections 270 may be configured to receive captured building features using 2D and 3D sensors, as described below.

The input/output devices 250 may include a two-dimensional camera 252, a depth sensor 254, such as a LiDAR system, a touchscreen 256, which allows users to enter information, and for pictorial information, etc., to be displayed, and/or the like. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200. The computing system may also be distributed for running portions of the software 285 on different central processing units ("CPUs").

The storage 240 may be removable or non-removable, and includes magnetic disks, magnetic tapes or cassettes, CD-ROMs, CD-RWs, DVDs, flash drives, or any other medium which can be used to store information, and which can be accessed within the computing environment 200. The storage 240 stores instructions for the software, such as region of interest detection software 285 to implement methods of touch fill animations, e.g., surface fill wall animations.

The input device(s) 250 may include a device that allows a user or another device to communicate or interact with the computing environment 200. Input devices 250 may include a touch input device such as a keyboard, a camera 252, a depth measurement system 254 such as a LIDAR system, a microphone, mouse, pen, or trackball, a scanning device, a touchscreen 256, or another device that provides input to the computing environment 200. For audio, the input device(s) 250 may include a sound card or similar device that accepts audio input in analog or digital form, or a CD-ROM reader that provides audio samples to the computing environment. The output device(s) 250 may include a touchscreen, display, printer, speaker, CD-writer, or another device that provides output from the computing environment 200. A Compass/Magnometer 290 may be included to allow the device to determine the direction pictures/images are taken with the 2D scanner 252 and Depth Sensor 254.

The communication connection(s) 270 enable communication over a communication medium to another computing entity. The communication medium conveys information such as computer-executable instructions, compressed graphics information, or other data in a modulated data signal. Communication connections 270 may comprise input/output devices 250, and input/output devices that allows a client device to communicate with another device over network 260. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 260 may be a combination of multiple different kinds of wired or wireless networks. The network 260 may be a distributed network, with multiple computers, which might be building controllers acting in tandem. A computing connection 270 may be a portable communications device such as a wireless handheld device, a cell phone device, and so on.

Computer-readable media are any available non-transient tangible media that can be accessed within a computing environment. By way of example, and not limitation, with the computing environment 200, computer-readable media include memory 220, storage 240, communication media, and combinations of any of the above. Computer readable storage media 265 may be used to store computer readable media comprises instructions 275 and data 280. Data sources may be computing devices, such as general hardware platform servers configured to receive and transmit information over the communications connections 270. The computing environment 200 may be an electrical controller that is directly connected to various resources, such as HVAC resources, and which has CPU 210, a GPU 215, Memory 220, input devices 250, communication connections 270, and/or other features shown in the computing environment 200. The computing environment 200 may be a series of distributed computers. These distributed computers may comprise a series of connected electrical controllers.

In one embodiment, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

In one embodiment, the computing environment 200 includes or is connected to a floor plan presentation apparatus 245. In one embodiment, the floor plan presentation apparatus 245 is configured to receive a user input selecting or classifying a surface of a structure presented on the display during dynamic generation of a 2D floor plan. The floor plan presentation apparatus 245, based on the user input, determines a plane surface that is drawn from a line segment of the 2D floor plan. In some embodiments, the line segment is a segment of a floorplan, and the plane may be thought of as lying along a wall within the space that is represented by the line segment. Vertices along this plane determine for themselves that they are to be highlighted. They then are gradually highlighted as a graphical animation that extends from a center point of the user input to an ending point, as described in more detail below. This shows a highlight color spreading along the wall defined by the line segment.

In certain embodiments, the floor plan presentation apparatus 245 may include a hardware device such as a secure hardware dongle or other hardware appliance device (e.g., a set-top box, a network appliance, or the like) that attaches to a device such as the 360-degree camera system 100, a head mounted display, a laptop computer, a server, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the floor plan presentation apparatus 245 may include a power interface, a wired and/or wireless network interface, a graphical interface that attaches to a display, and/or a semiconductor integrated circuit device as described below, configured to perform the functions described herein with regard to the floor plan presentation apparatus 245.

The floor plan presentation apparatus 245, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the floor plan presentation apparatus 245 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the floor plan presentation apparatus 245.

The semiconductor integrated circuit device or other hardware appliance of the floor plan presentation apparatus 245, in certain embodiments, includes and/or is communicatively coupled to one or more volatile memory media, which may include but is not limited to RAM, DRAM, cache, or the like. In one embodiment, the semiconductor integrated circuit device or other hardware appliance of the floor plan presentation apparatus 245 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), DRAM, phase change RAM ("PRAM" or "PCM"), magnetic storage media (e.g., hard disk, tape), optical storage media, or the like.

Figure 3:
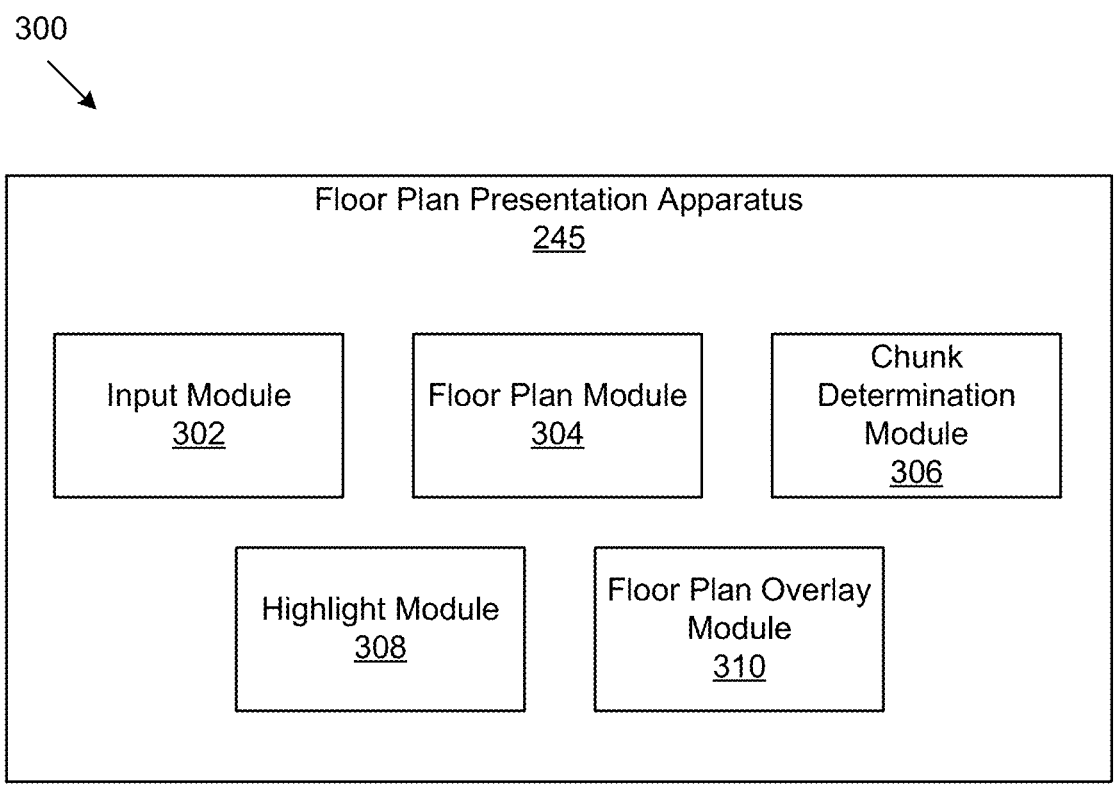
FIG. 3 is a block diagram illustrating one embodiment of an apparatus for surface animation during dynamic floor plan generation.

FIG. 3 depicts one embodiment of an apparatus 300 for presenting floor plans. In one embodiment, the apparatus 300 includes an embodiment of a floor plan presentation apparatus 245. In one embodiment, the floor plan presentation apparatus 245 includes one or more of an input module 302, a floor plan module 304, a chunk determination module 306, and a highlight module 308, which are described in more detail below.

In one embodiment, the input module 302 is configured to receive a user input selecting or classifying a surface of a structure presented on the display where the surface defines a portion of a floor plan. In such an embodiment, the input module 302 may monitor, listen, poll, or the like for an input event, e.g., on a touch screen device, while a surface of a structure is viewable on the display, e.g., as captured by a camera.

For example, as shown in FIG. 4, to capture a space such as a room, hall, office, or the like, in some embodiments, a user may walk around pointing a device that includes both a camera and a depth scanner, e.g., a handheld smart device with a LiDAR sensor, at areas within the space, from multiple perspectives. A graphical mesh 402, such as a LiDAR mesh, may be presented overlaying the image capture of the structure 404, e.g., a wall, door, cabinet, window, or the like.

Figure 4A:
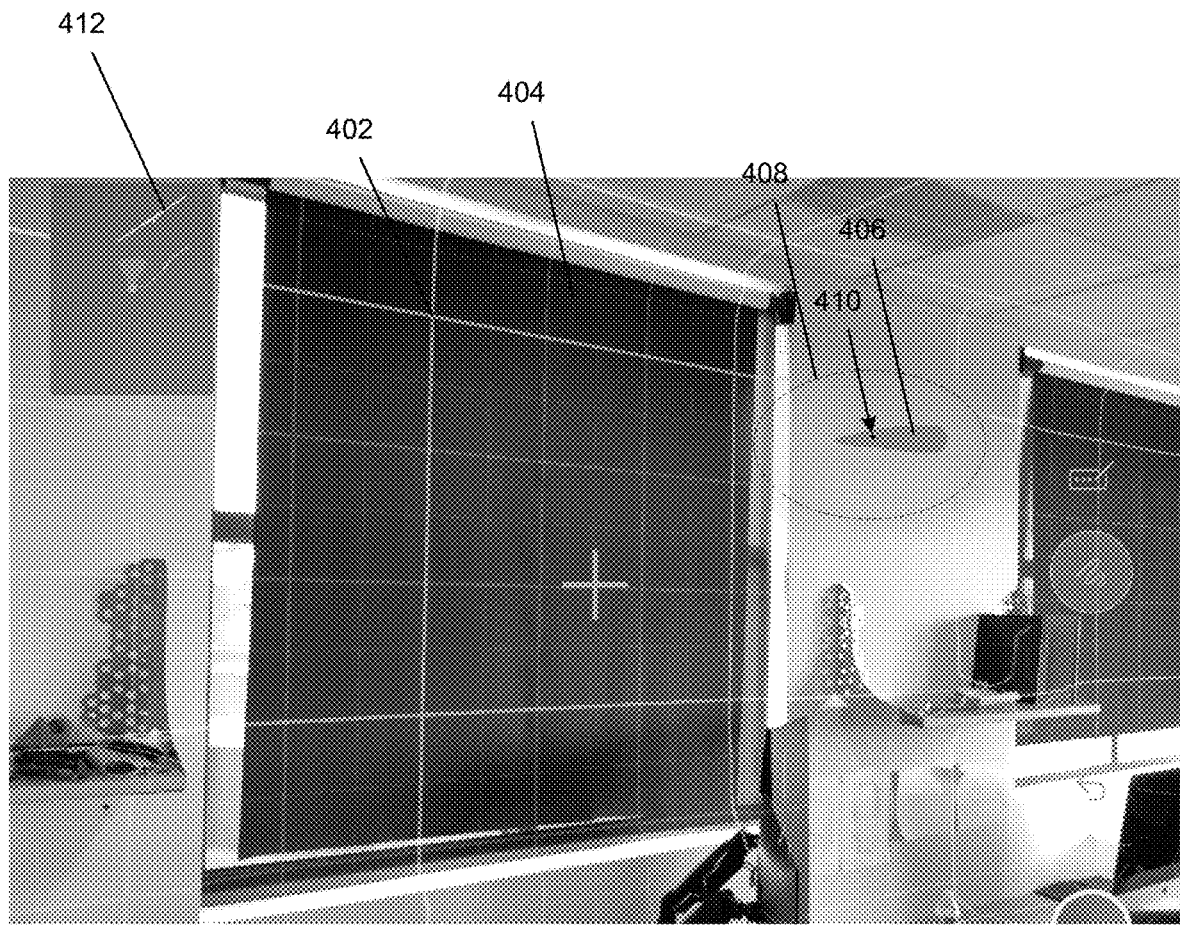
FIG. 4A depicts an example embodiment of surface animation during dynamic floor plan generation using AR.

In one embodiment, the user input comprises a touch input received on the display, the touch input graphically represented by a marker 406 on the surface presented on the display. As shown in FIG. 4A, in one embodiment, the user input is associated with the graphical mesh 402, e.g., a LiDAR mesh, of the surface of the structure 404 that is presented on the display in an AR environment that overlays the image/video of the structure 404.

In one embodiment, the floor plan module 304 is configured to generate, in response to the user input, a 2D representation of a floor plan comprising a 2D line segment representing a structure such as a wall. A user may place annotations, e.g., markings described above, on a display in an area indicating a wall, the indication in 2D. A pre-trained machine learning algorithm may then be used to place the annotation made by the user within the 3D mesh environment. The annotations act as hints to identify the general location of features the user cares about, such as, in this case, walls. In one embodiment, the chunk determination module 306 is configured to determine at least one 3D element associated with the line segment representing the surface on the two-dimensional floor plan. In such an embodiment, the 3D element is a three-dimensional chunk of the LiDAR graphical mesh, which may be displayed in the AR environment that overlays the image of the structure on the display, of the surface of the structure, e.g., a 3D representation of the elements or components that comprise the graphical mesh such as a plurality of cubes or other structures. An example of such a 3D representation is shown with respect to FIG. 9 at 900.

Figure 5A:
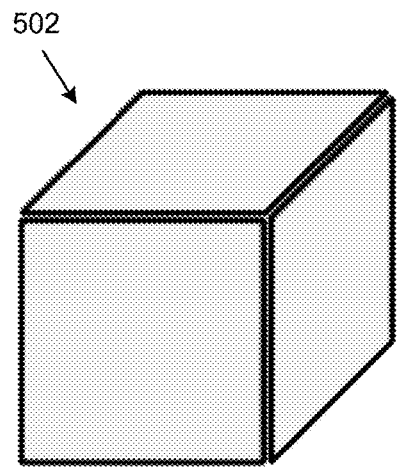
FIG. 5A depicts an example of a bounding box around a three-dimensional chunk.

In one embodiment, the chunk determination module 306 creates a bounding box around the chunks, as described with reference to FIGS. 5A and 5B. A plane may be created along the line segment. This plane may lie along a Z axis, or may lie along a different axis. There may be an intersection test performed with the plane described with reference to FIGS. 5a and 5b that is used to generate a list of plausibly close vertices ones that might be shaded will intersect or be very close to the plane. The intersection test may be performed by bounding box, in that only vertices in a bounding box that intersect with the line segment will be considered. Each line segment may be represented by one or more chunks, therefore, one or more bounding boxes may be considered. That is, only vertices within a bounding box will be considered for shading. A vertex shader may then be used to compute the distance to the plane in that plausible set, determined by the bounding boxes that intersect the line segment, to determine its color output. As used herein, a vertex shader comprises a graphics processing function used to add special effects, e.g., coloring or shading, to objects in a 3D environment by performing mathematical operations on the 3D mesh's vertex data. This allows for an effect such as shading indicating the scope of a wall as detected by a combination of the user input, processing of the underlying mesh structure, etc.

In one embodiment, the highlight module 308 is configured to gradually highlight the vertices that have been found to align with a structure such as a wall that. In one embodiment, the highlight is presented as a graphical animation that extends at a certain rate, over time, from a center point of the user input to an ending point.

In one embodiment, the highlight comprises a semi-transparent color that gradually floods the representation of the surface on the display from the center point of the user input to the ending point. In one embodiment, the highlight gradually extends as a radius from the center point of the user input at a predefined rate. In one embodiment, the ending point includes at least one of a corner and a point that is a threshold distance from the center point of the user input. The threshold may be a distance, a length, or the like e.g., in pixels, and may be configurable by a user. Furthermore, in one embodiment, the user may configure the rate at which the highlight "floods" the surface of the structure 404.

For example, as shown in FIG. 4A, a segment, graphically presented on the display at 412, may have been discovered by a combination of a user input 406 and processing the underlying 3D and 2D representation. A the highlight 408 that will highlight the extent of the wall represented by the segment may begin growing, emanating, flooding, or extending, at a first time t1, from a substantially center point 410 of the user's touch input, e.g., the user's mark 406. It will gradually "flood" the surface of the structure 404 that represents the extent of the currently discovered wall, e.g., the highlight module 308 overlays an AR representation of a highlight or color using the presented 3D graphical mesh to determine which portions of the surface of the structure 404 should be colored. This shows the user what the room configuration (or a portion thereof) currently is understood to be. If the structure highlighted does not extend all the way along the wall representation, then the user may touch another section of the wall, indicating that a wall extends into the touched area. This will produce highlighting through the area on the user device now determined to be wall. A user can repeat this process until a room is completed.

Figure 4B:
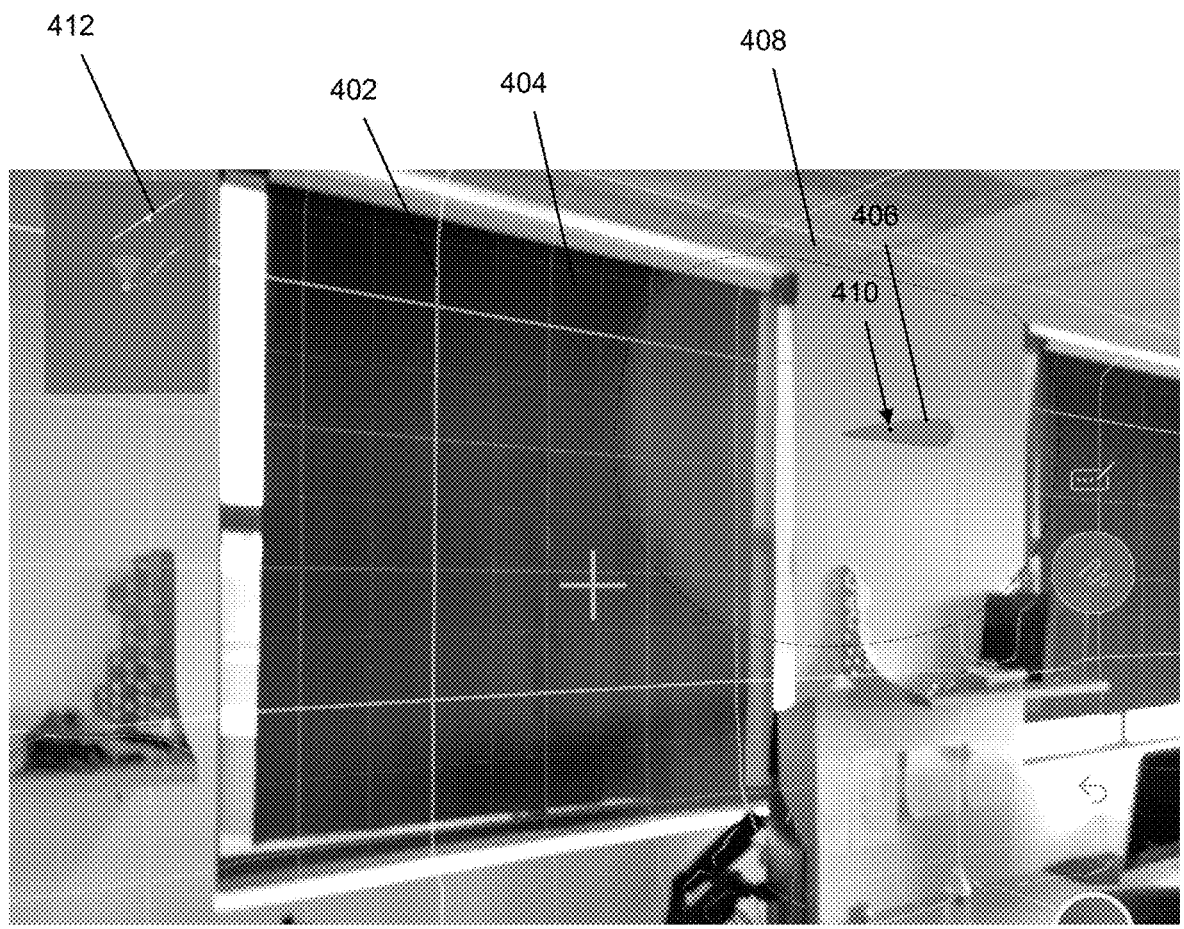
FIG. 4B is a continuation of FIG. 4A.
Figure 4C:
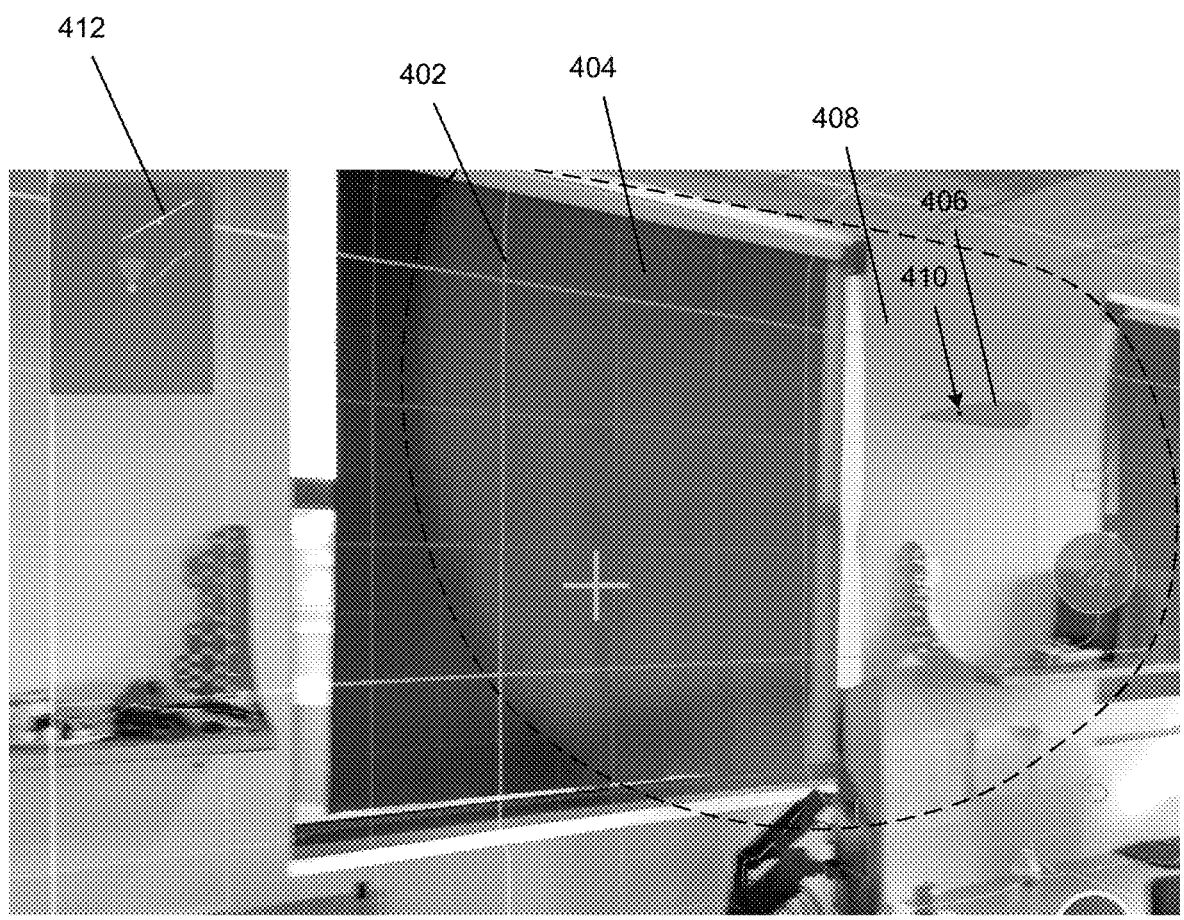
FIG. 4C is a continuation of FIG. 4B.

FIG. 4B illustrates the highlight 408 at a second time t2, which has "flooded" or covered a larger area of the surface of the structure 404. FIG. 4C illustrates the highlight 408 at a third time t3, which has "flooded" or covered an even larger area of the surface of the structure 404. It is noted that the highlight module 308 does not highlight or color portions of the 3D mesh that are located on a different surface than the indicated surface, e.g., the ceiling, the floor, shelves, desks, a different wall, or the like. Rather, it ignores faces whose normal direction does not match the marked surface. As shown in FIGS. 4A-4C, it is shown that the highlight stops at the intersection of the ceiling mesh and the wall mesh such that the highlight does not extend to the ceiling.

In one embodiment, the floor plan overlay module 310 is configured to overlay a graphic representing the 2D floor plan on the display. Referring to FIGS. 4A-4C, the floor plan overlay module 310 may present an overlay 412 that presents the current 2D floor plan that the user has generated, based on the user's input (markers) 406, as the user moves through the space and marks the structures 404 that define the space. Thus, the 2D floor plan is generated and presented at substantially the same time that the highlight module 308 triggers the highlight of the surface of the structure 404.

In one embodiment, the input module 302 is configured to receive a second user input associated with a second surface of a second structure presented on the display and the floor plan module 304 is configured to generate a second 2D floor plan that is a copy of the current 2D floor plan and additionally includes a second line segment representing the second surface. For example, if the first line segment of the 2D floor plan represents a first wall that the user marks and then, as the user walks around the space and marks a different wall that is adjacent to the first wall, the floor plan module 304 adds a second line segment to the current 2D floor plan, to create a new 2D floor plan, and so on.

In further embodiments, the chunk determination module 306 determines at least one 3D element associated with the second line segment representing the second surface on the second 2D floor plan. In one embodiment, the highlight module 308 gradually highlights the second surface shown on the display where the second geometric plane that the second line segment defines intersects with the at least one 3D element associated with the second line segment. In one embodiment, the highlight is presented as a graphical animation that extends from a center point of the second user input to a second ending point. In such an embodiment, the highlight associated with the second user input merges with, overlaps with, or otherwise combines with the highlight that is associated with the first user input. In certain embodiments, after the user provides additional inputs, e.g., additional marks, and the floor plan module 304 generates a new 2D floor plan, the highlight module 308 generates highlights, e.g., triggers highlight animations, for one or more of the user inputs again.

In one embodiment, the floor plan overlay module 310, on the display, fades out the overlay of the graphic representing the 2D floor plan and fades in a second overlay of a second graphic representing the second 2D floor plan (which may or may not be transparent or unnoticeable to the user). In one embodiment, the highlight module 308 completes the highlight of the second surface at substantially the same time as the second overlay of the second graphic representing the second 2D floor plan fades in.

In one embodiment, the second structure is a different structure than the first structure, e.g., a different wall. However, in one embodiment, the second structure is the same as the first structure and the second surface includes a different portion of the first structure than the first surface, e.g., in the event of a long wall or other structure.

In embodiments, a 3D mesh floor plan, e.g., the floor plan generated during a user scan as discussed with relation to FIGS. 4A-4C, is divided into chunks. The generation of the floor plan has also generated segments that define a known feature, such as walls. These segments may be a version of a line segment shown with reference to FIG. 4a at 412—which itself defines a wall—defined by a user placing marks, e.g. 406, on a 3D scan of a room. Each segment will intersect at least one chunk, some will intersect two, three, or four chunks, some segments may intersect more chunks. In embodiments, vertices within the mesh are associated with a single chunk. In some embodiments, each vertex is associated with more than one chunk. Some embodiments have a maximum of four chunks that a segment may intersect, some embodiments may allow a segment to intersect more chunks, some embodiments may allow a segment to intersect fewer chunks. For each segment, a bounding box is built around each chunk associated with the segment, (the chunk being probably quite irregular). FIG. 5A depicts one embodiment of a 3D element 502, e.g., a bounding box around a chunk, that is used to determine which portions of the 3D graphical mesh overlay to color/highlight in response to a user's input. In the depicted embodiment, the 3D element 502 is a cube, but it could be other 3D objects such as irregular shapes, rhombuses, pyramids, or the like.

The segments are extended until they are sufficiently tall. "Sufficiently tall" may be tall enough to clear a ceiling and/or a floor, if they exist in a given embodiment. "Sufficiently tall" may be very tall. "Sufficiently tall" may be effectively infinitely tall. This height may extend in both the positive and the negative Z direction. These may be considered geometrical planes. An extended segment An example of a If this tall segment plane intersects a bounding box of a chunk, then vertices within that chunk will potentially be used in the animation. When the animation is drawn, each vertex of the mesh itself has to decide its own color. To do so, the vertex may determine if it is in a bounding box. If not, then the vertex will not be colored. If it is in a bounding box, then the vertex has the potential for being colored. However, only vertices close to the segment plane will be colored. To do so, the vertex itself examines the list of segments that intersects the chunk bounding box it is part of. If the vertex is close enough to the geometrical plane 504, then that vertex is colored. The vertex does not look at the neighbor's color; rather, it decides itself what its color is. This has the effect that shelves and other objects on the wall are not colored as they are not close enough. The measure of closeness may be a continuous factor, such that the measure may be, for example an inverse relation 1/d where d is the distance.

Figure 5B:
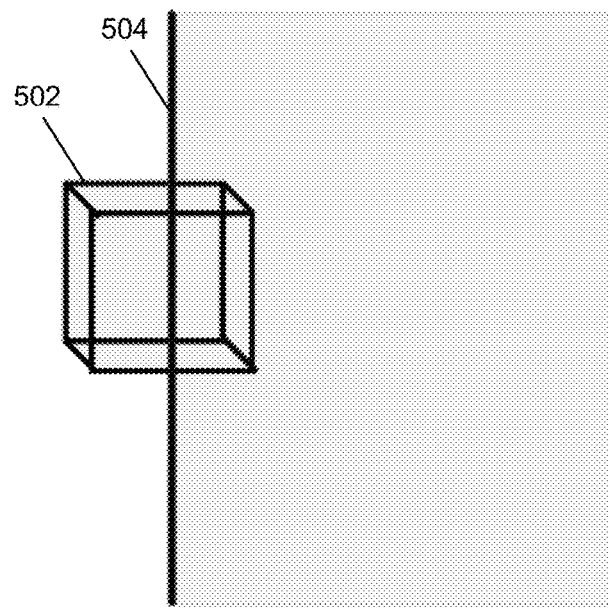
FIG. 5B depicts an example of a two-dimensional line segment intersecting a bounding box around a three-dimensional chunk.

FIG. 5B depicts an overhead view of a line segment 504 of a 2D floor plan and a three-dimensional element 502 (a chunk) chunk that is defined by the line segment 504. The geometrical plane may be thought of as extending out from the line segment 504 such that it slices through the three-dimensional element 502. If this figure were tipped, the line 504 would appear as a plane. In such an embodiment, the chunk determination module 306 determines which vertices within the 3D mesh intersect with the plane that the line segment 504 defines, based on the location of the user input and the size of the highlighted area. In some embodiments, each chunk of the graphical mesh has a bounding box. In some embodiments, when the highlight is rendered, vertices that intersect the geometric plane and/or are very close to the geometrical plane are provided to a renderer, e.g., a vertex shader, along with chunk data at render time. The vertex shader may determine how much each edge should be colored based on whether it is contained within the floor plan edge, or a different method may be used.

Figure 6:
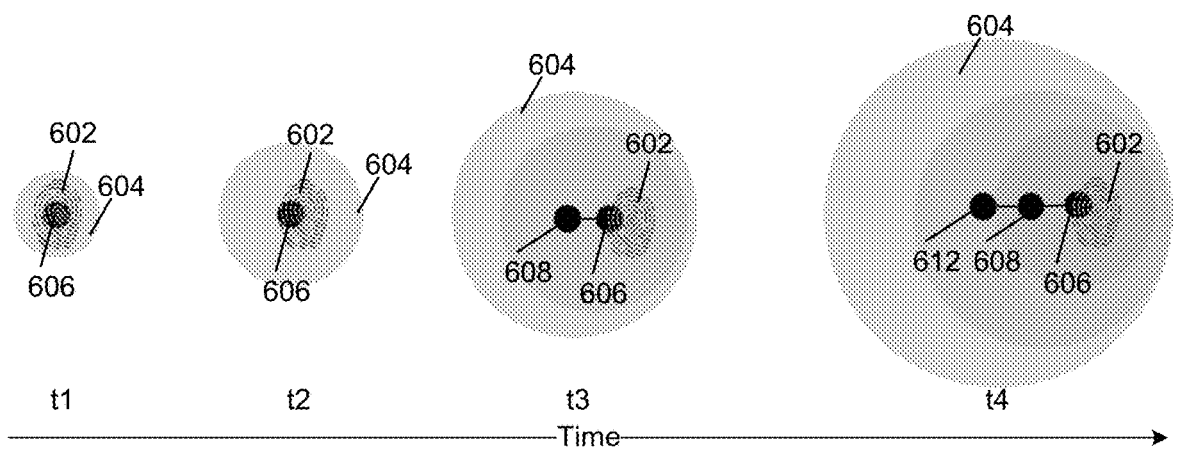
FIG. 6 depicts an animation flow over time.

FIG. 6 depicts an example of the flood highlighting, which grows over time. In one embodiment, the flood highlighting communicates to the user the surface that is associated with the user's touch/marking. At time t1, the user's touch 602 is detected, e.g., on a touch screen, and the center 606 of the user's touch 602 is determined. The area around the center 606 of the user's touch 602 is highlighted 604.

In one embodiment, at time t2, the highlight 604 extends even further around the center 606. At time t3, the highlight 604 extends to the left around a different center point 608. In further embodiments, at time t4, the highlight 604 extends even further to the left around a different center point 612. This process may continue up to a predetermined period of time or a or a threshold distance from the user's mark 602.

In some embodiments, this appears as a growing circle of touch, which combines with the current floorplan segments to fill in nicely, showing what the new floorplan looks like. For example, the animation may grow into a corner and then stop, if the floorplan segments stop at the corner. In some embodiments, a user adding a new touch to the screen will create a new wall portion that intersects with the current wall-a corner. In such instances, the animation should grow around the corner to the end of the discovered floorplan line segment. In some embodiments, the corner is animated by restricting the flood feel by segment. For example, when one segment is turned into two segments because a new mark added by a user has added a corner wall, the new animation fill may be restricted to the new corner segment. This transaction may be handled by having two copies of the floor plan—the previous one before modification, and the new one after the modification.

Figure 7A:
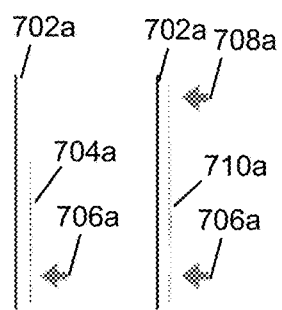
FIG. 7A depicts an example of an animation transition.
Figure 7B:
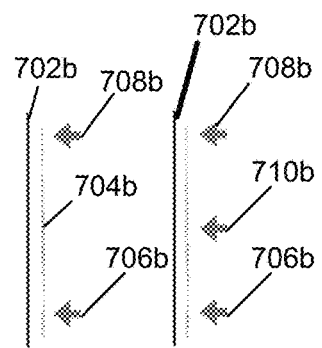
FIG. 7B depicts an example of another animation transition.
Figure 7C:
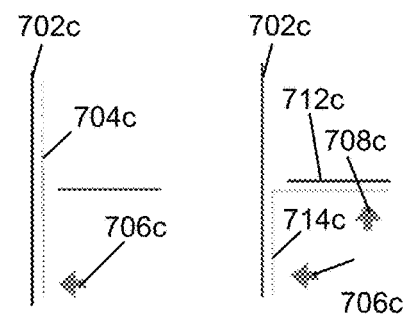
FIG. 7C depicts an example of another animation transition.

FIGS. 7A-7C depict different highlight transition scenarios. These transition scenarios may happen concurrent with the flood highlighting, or at a different time, such as slightly before, slightly after, etc. FIG. 7A depicts a wall 702a and a user's input/mark 706a that is received on the device depicting the wall 702a.

In response to a new/second touch 708a received at a different portion of the wall 702a, the preview/2D overlay is extended and the flood highlight transition/animation 710a extends to cover the wall 702a from the first mark 706a to the second mark 708a.

FIG. 7B depicts a wall 702b that has received two user marks 706b, 708b and includes a highlight 704b that covers the extent of the wall 702b between the two user marks 706b, 708b. In one embodiment, the user adds a new mark 710b between the two existing user marks 706b, 708b. In response to the new mark 710b, subtle flood highlight animation is performed, but there is no change to the 2D floor plan.

FIG. 7C depicts a wall 702c and a flood highlight 704c that covers the extent of the wall 702c in response to a user's mark 706c. Detecting a user's mark 708c on a different, perpendicular wall 712c, will add a new intersection and a corner to the 2D floor plan. This will result in trimming the extent of the previously highlighted portion 704c. Accordingly, the old extent 704c is trimmed to the newly created corner; with the animation filling the new area 712c, and meeting the old line 704c at the corner.

As described above, the transition, in response to a new user input/mark, is handled by maintaining two copies of the 2D floor plan—the previous 2D floor plan before the modification and a second 2D floor plan after the modification. The old 2D floor plan fades out (704a, 704b, 704c) and the new 2D floor plan (710a, 710b, 714C) fades in. In other words, wall coloring/highlight may initially show the current floor plan state. When a mark is added, a new floor plan is generated with the mark animation starting at each stored node (e.g., 406). The old floor plan begins fading out and the new floor plan begins fading in. Fading in of the new floor plan and completion of the mark animation may coincide.

Figure 8:
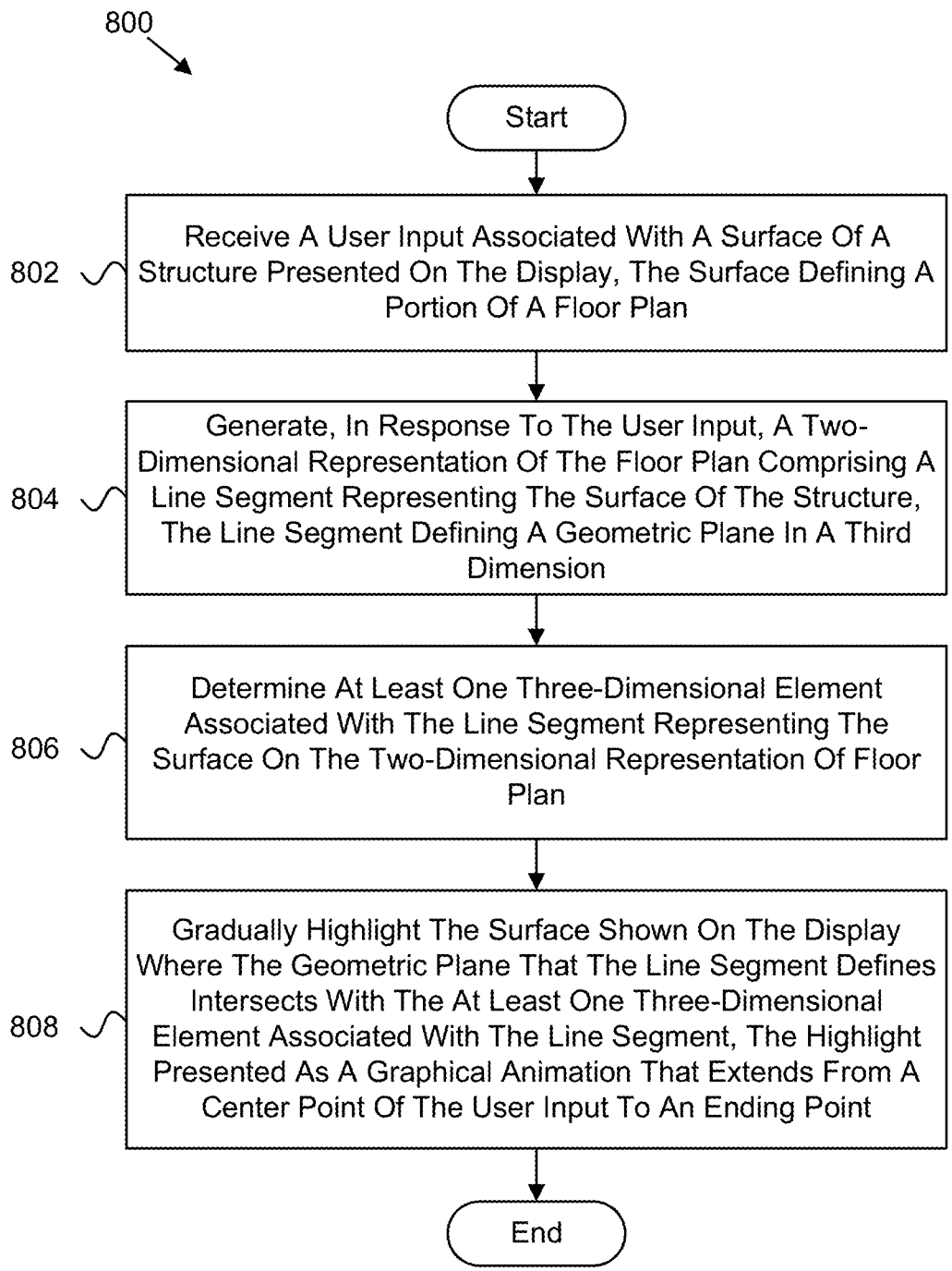
FIG. 8 is a schematic block diagram illustrating one embodiment of a method for surface animation during dynamic floor plan generation.

FIG. 8 depicts a schematic flow chart diagram illustrating one embodiment of a method 800 for surface animation during dynamic floor plan generation. In one embodiment, the method 800 begins and receives 802 a user input associated with a surface of a two dimensional representation of a floor plan presented on the display. This surface may be represented by a line segment representation. This line segment representation may be a floorplan segment that defines the surface, which may be a floor plan. Examples of these floor plan segments are shown with reference to FIGS. 7A-7C, which, among other things, defines walls as their floor plan segments—the outline on the floor that a wall would make. This outline may be represented as a 2D line. This surface may be a wall representation, as shown with reference to FIG. 4A. The user input input may be a touch that produces a mark, such as that shown with reference to 40. In one embodiment, the method 800 generates 804, in response to the user input, a two-dimensional representation of the floor plan comprising a line segment representing the surface of the structure, the line segment defining a geometric plane in a third dimension. In one embodiment, the method 800 determines 806 at least one three-dimensional element associated with the line segment representing the surface on the two-dimensional representation of floor plan. This three-dimensional element may be a chunk, such as described with reference to FIGS. 5A and 5B, or a bounding box around the chunk, or another feature. Intersection tests, and the like, may be performed, as discussed previously. In one embodiment, the method 800 gradually highlights 808 the surface shown on the display where the geometric plane that the line segment defines intersects with the at least one three-dimensional element associated with the line segment, the highlight presented as a graphical animation that extends from a center point of the user input to an ending point, and the method 800 ends. The gradual highlight may extend such as shown with reference to FIG. 6, or may extend in a different matter.

Figure 9:
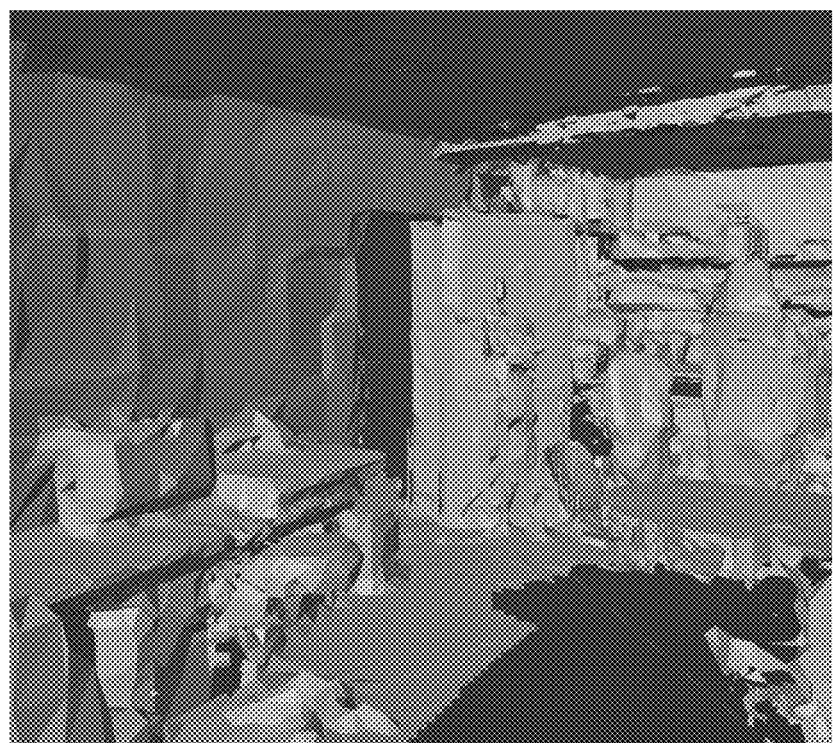
FIG. 9 is an example mesh cloud that defines a portion of a room.

FIG. 9 at 900 depicts an example 3D mesh cloud 900 that defines a portion of a space. This space may be room in a building, or another space, such as outdoor stadium, etc. In embodiments, this mesh is composed of faces, also known as vertices, the faces having a normal vector that is either aligned with gravity or aligned in a direction opposite to gravity.

A means for receiving a user input associated with a surface of a structure presented on a display, in various embodiments, may include one or more of a computing environment 200, a floor plan presentation apparatus 245, an input module 302, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving a user input associated with a surface of a structure presented on a display.

A means for receiving a user input associated with a surface of a structure presented on a display, in various embodiments, may include one or more of a computing environment 200, a floor plan presentation apparatus 245, an input module 302, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving a user input associated with a surface of a structure presented on a display.

A means for generating, in response to the user input, a two-dimensional representation of the floor plan comprising a line segment representing the surface of the structure, in various embodiments, may include one or more of a computing environment 200, a floor plan presentation apparatus 245, an floor plan module 304, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for generating, in response to the user input, a two-dimensional representation of the floor plan comprising a line segment representing the surface of the structure.

A means for determining at least one three-dimensional element associated with the line segment representing the surface on the two-dimensional representation of floor plan, may include one or more of a computing environment 200, a floor plan presentation apparatus 245, a chunk determination module 306, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for determining at least one three-dimensional element associated with the line segment representing the surface on the two-dimensional representation of floor plan.

A means for gradually highlighting the surface shown on the display where the geometric plane that the line segment defines intersects with the at least one three-dimensional element associated with the line segment, the highlight presented as a graphical animation that extends from a center point of the user input to an ending point, in various embodiments, may include one or more of a computing environment 200, a floor plan presentation apparatus 245, a highlight module 308, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for gradually highlighting the surface shown on the display where the geometric plane that the line segment defines intersects with the at least one three-dimensional element associated with the line segment, the highlight presented as a graphical animation that extends from a center point of the user input to an ending point.

Means for performing the other method steps described herein, in various embodiments, may include one or more of a computing environment 102, a floor plan presentation apparatus 245, an input module 302, a floor plan module 304, a chunk determination module 306, a highlight module 308, a floor plan overlay module 310, a vertex shader, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the method steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a display configured to receive touch input;
    a processor coupled to the display; and
    a memory that stores code executable by the processor to:
        receive a user input associated with a surface of a structure presented on the display, the surface defining a portion of a floor plan;
        generate, in response to the user input, a two-dimensional representation of the floor plan comprising a line segment representing the surface of the structure, the line segment defining a geometric plane in a third dimension;
        determine at least one three-dimensional element associated with the line segment representing the surface on the two-dimensional representation of floor plan; and
        gradually highlight the surface shown on the display where the geometric plane that the line segment defines intersects with the at least one three-dimensional element associated with the line segment, the highlight presented as a graphical animation that extends from a center point of the user input to an ending point; and
        wherein the highlight gradually extends as a radius from the center point of the user input at a predefined rate.

2. The apparatus of claim 1, wherein the code is executable by the processor to overlay a graphic representing the two-dimensional representation of floor plan on the display.

3. The apparatus of claim 2, wherein the code is executable by the processor to:
    receive a second user input associated with a second surface of a second structure presented on the display;
    generate a second two-dimensional representation of floor plan that is a copy of the two-dimensional representation of floor plan and further includes a second line segment representing the second surface, the second line segment defining a second geometric plane in the third dimension; and
    replace the two-dimensional representation of floor plan with the second two-dimensional representation of floor plan that includes the second line segment.

4. The apparatus of claim 3, wherein the code is executable by the processor to:
    determine at least one three-dimensional element representation of floor plan; and
    gradually highlight the second surface shown on the display where the second geometric plane that the second line segment defines intersects with the at least one three-dimensional element associated with the second line segment, the highlight presented as a graphical animation that extends from a center point of the second user input to a second ending point.

5. The apparatus of claim 4, wherein the code is executable by the processor to, on the display, fade out the overlay of the graphic representing the two-dimensional representation of floor plan and fade in a second overlay of a second graphic representing the second two-dimensional representation of floor plan.

6. The apparatus of claim 5, wherein the code is executable by the processor to complete the highlight of the second surface at substantially a same time as the second overlay of the second graphic representing the second two-dimensional representation of floor plan fades in.

7. The apparatus of claim 3, wherein the second structure is same as the structure, the second surface comprising a different portion of the structure than the surface.

8. The apparatus of claim 1, wherein the highlight comprises a semi-transparent color that gradually floods the two dimensional representation of the floor plan on the display from the center point of the user input to the ending point.

9. The apparatus of claim 1, wherein the ending point comprises at least one of a corner or a point that is a threshold distance from the center point of the user input.

10. The apparatus of claim 1, wherein the user input comprises a touch input received on the display, the touch input graphically represented by a marker on the surface presented on the display.

11. The apparatus of claim 1, wherein the apparatus further comprises a vertex shader that is used to determine edges of the at least one three-dimensional element that should be highlighted based on whether the geometric plane that the line segment defines intersecting with the at least one three-dimensional element.

12. The apparatus of claim 1, wherein the apparatus further comprises a light detection and ranging ("LiDAR") sensor that is used to generate a graphical mesh of the surface of the structure, the graphical mesh presented on the display in an augmented reality ("AR") environment overlaying an image of the structure.

13. The apparatus of claim 12, wherein the at least one three-dimensional element is a three-dimensional chunk of the graphical mesh.

14. The apparatus of claim 1, wherein the code is executable by the processor to highlight one or more vertices of the at least one three-dimensional element that intersects the geometric plane that the line segment defines.

15. The apparatus of claim 1, wherein the structure comprises a wall of a building.

16. A method, comprising:
- receiving a user input associated with a surface of a structure presented on a display, the surface defining a portion of a floor plan;
- generating, in response to the user input, a two-dimensional representation of the floor plan comprising a line segment representing the surface of the structure, the line segment defining a geometric plane in a third dimension;
- determining at least one three-dimensional element associated with the line segment representing the surface on the two-dimensional representation of a floor plan;
- gradually highlighting the surface shown on the display where the geometric plane that the line segment defines intersects with the at least one three-dimensional element associated with the line segment, the highlight presented as a graphical animation that extends from a center point of the user input to an ending point; and
- wherein the highlight gradually extends as a radius from the center point of the user input at a predefined rate.

17. The method of claim 16, further comprising:
- receiving a second user input associated with a second surface of a second structure presented on the display;
- generating a second two-dimensional representation of floor plan that is a copy of the two-dimensional representation of floor plan and further includes a second line segment representing the second surface, the second line segment defining a second geometric plane in the third dimension; and
- replacing the two-dimensional representation of floor plan with the second two-dimensional representation of floor plan that includes the second line segment.

18. The method of claim 16, further comprising:
- determining at least one three-dimensional element associated with the second line segment representing the second surface; and
- gradually highlighting the second surface on the display where the second geometric plane such that the second line segment defines intersects with the at least one three-dimensional element associated with the second line segment, the highlight presented as a graphical animation that extends from a center point of the second user input to a second ending point.

19. A non-transitory machine-readable medium, comprising:
- instructions for receiving a user input associated with a surface of a structure presented on a display, the surface defining a portion of a floor plan;
- instructions for generating, in response to the user input, a two-dimensional representation of the floor plan comprising a line segment representing the surface of the structure, the line segment defining a geometric plane in a third dimension;
- instructions for determining at least one three-dimensional element associated with the line segment representing the surface on the two-dimensional representation of floor plan;
- instructions for gradually highlighting the surface shown on the display where the geometric plane that the line segment defines intersects with the at least one three-dimensional element associated with the line segment, the highlight presented as a graphical animation that extends from a center point of the user input to an ending point; and
- wherein the highlight gradually extends as a radius from the center point of the user input at a predefined rate.

20. The non-transitory machine-readable medium of claim 19, wherein the user input comprises a touch input received on the display, the touch input graphically represented by a marker on the surface presented on the display.

* * * * *